United States Patent
Kusakabe (10) Patent No.: US 11,164,331 B2
(45) Date of Patent: Nov. 2, 2021

(54) INFORMATION PROCESSING APPARATUS, SYSTEM, METHOD FOR CONTROLLING INFORMATION PROCESSING APPARATUS, AND NON-TRANSITORY COMPUTER READABLE STORAGE MEDIUM

(71) Applicant: CANON KABUSHIKI KAISHA, Tokyo (JP)

(72) Inventor: Minoru Kusakabe, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 53 days.

(21) Appl. No.: 16/262,298

(22) Filed: Jan. 30, 2019

(65) Prior Publication Data

US 2019/0244389 A1  Aug. 8, 2019

(30) Foreign Application Priority Data

Feb. 5, 2018  (JP) .............................. JP2018-018520

(51) Int. Cl.
*G06K 9/00* (2006.01)
*G06T 7/73* (2017.01)

(52) U.S. Cl.
CPC ...... *G06T 7/74* (2017.01); *G06T 2207/30196* (2013.01)

(58) Field of Classification Search
None
See application file for complete search history.

(56) References Cited

U.S. PATENT DOCUMENTS

| | | | |
|---|---|---|---|
| 2013/0129221 A1* | 5/2013 | Nakao | G06K 9/62 382/190 |
| 2017/0220871 A1* | 8/2017 | Ikeda | G06K 9/00342 |
| 2018/0165515 A1 | 6/2018 | Kusakabe | |
| 2018/0240251 A1* | 8/2018 | Kitagawa | H04N 5/2351 |

FOREIGN PATENT DOCUMENTS

| | | |
|---|---|---|
| JP | 2014010686 A | 1/2014 |
| JP | 2014020569 A | 2/2014 |
| JP | 2018005805 A | 1/2018 |

* cited by examiner

*Primary Examiner* — Wei Wen Yang (74) *Attorney, Agent, or Firm* — Carter, DeLuca & Farrell LLP (57) ABSTRACT

An information processing apparatus comprising, a first determination unit configured to determine whether a subject corresponding to a person is included in an input image, and a second determination unit configured to associate a first region corresponding to a first subject determined to be included in the input image by the first determination unit with a second region determined to include the first subject in one or more images input earlier than the input image, and to determine whether the first subject is to be included in a person detection result on the basis of a degree of a temporal change of feature amounts obtained from the first region and the second region, respectively.

12 Claims, 6 Drawing Sheets

INFORMATION PROCESSING APPARATUS, SYSTEM, METHOD FOR CONTROLLING INFORMATION PROCESSING APPARATUS, AND NON-TRANSITORY COMPUTER READABLE STORAGE MEDIUM

BACKGROUND OF THE INVENTION

Field of the Invention

The present disclosure relates to an information processing apparatus, a system, a method for controlling the information processing apparatus, and a non-transitory computer readable storage medium.

Description of the Related Art

In recent years, technology for counting people, which permits the tracking of the presence or absence of persons as well as a number of persons, highlighting for monitoring, and person authentication by analyzing persons in a captured image, has been applied to various fields, such as monitoring cameras.

When a person is to be detected from an image, a subject that may be mistakenly identified as a person, such as a photograph or a doll, may be captured. When such an image is analyzed, there are instances where a person in a photograph or a poster or a person on television, for example, is misidentified as a person in a captured space. As a consequence, an incorrect number of persons is counted. In particular, when the number of persons entering and leaving a store is counted at an entrance of a store, an extremely large number of persons may be counted when a poster adhered in the vicinity of the entrance is misdetected.

Further, when the number of persons is counted in an environment in which a large number of persons come and go, images need to be captured at such a frame rate that a person passing through will not be missed. Furthermore, at an entrance of a store or the like, normally a sufficiently large space relative to a human body is reserved to allow passage of a plurality of persons, and thus a suitable imaging resolution must be ensured to capture the persons within the space. As a consequence, high-resolution and high frame rate images (moving images or still images) are captured. However, the processing applied to such images must be low load processing since high load processing results in a loss in processing efficiency.

Here, a method for restricting the misdetection described above by applying low load processing to the captured image is proposed (Japanese Patent Laid-Open No. 2014-20569). In this method, a person detected in a predetermined position in a plurality of frames is excluded from the detection result.

Nevertheless, with such a determination method based on a position in an image as described in Japanese Patent Laid-Open No. 2014-20569, when a position moves by the opening and closing of an automatic door, such as the position of a person in a poster adhered to an automatic door of a store, for example, it becomes difficult to exclude the person from the detection result. On the other hand, when determination is made on the basis of position, a person may be excluded from detection results in a case where the person is standing still in the predetermined position.

SUMMARY OF THE INVENTION

Technology for enabling detection of a person who actually exists in a space and is targeted for detection with greater efficiency is provided.

One aspect of embodiments relates to an information processing apparatus comprising a first determination unit configured to determine whether a subject corresponding to a person is included in an input image; and a second determination unit configured to associate a first region corresponding to a first subject determined to be included in the input image by the first determination unit with a second region determined to include the first subject in one or more images input earlier than the input image, and to determine whether the first subject is to be included in a person detection result on the basis of a degree of a temporal change of feature amounts obtained from the first region and the second region, respectively.

Further features of the invention will become apparent from the following description of exemplary embodiments (with reference to the attached drawings).

DESCRIPTION OF THE EMBODIMENTS

Figure 1:
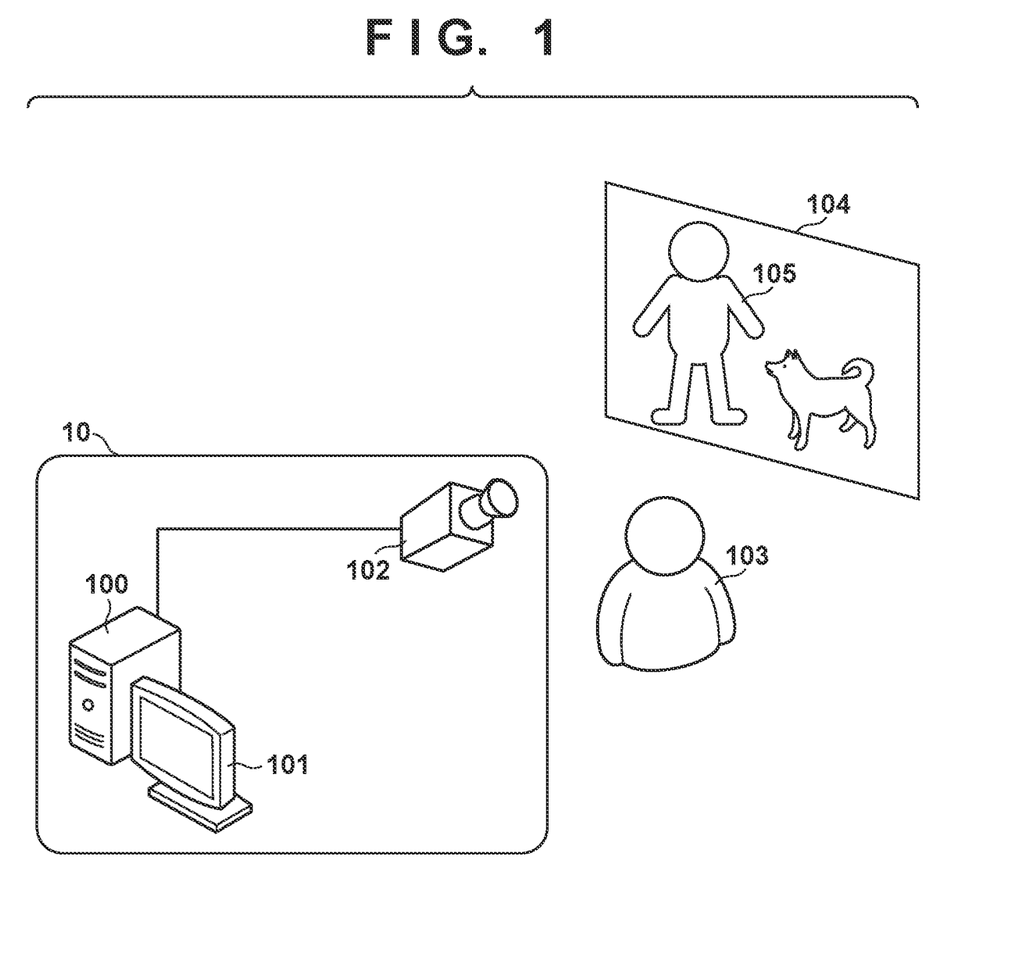
FIG. 1 is a figure illustrating a configuration of a person detection system according to an embodiment of the invention.

Embodiments of the invention are described below with reference to the drawings. First, a system configuration according to an embodiment of the invention will be described by referring to FIG. 1. FIG. 1 is a figure illustrating a configuration example of a person detection system 10 according to an embodiment of the invention. The person detection system 10 is configured to include an information processing apparatus 100, a display unit 101, and a network camera 102. The information processing apparatus 100 is an apparatus that performs person detection processing according to the present embodiment, and a processing result of the information processing apparatus 100 is displayed on the display unit 101. An operator of the information processing apparatus 100 can check the processing result by referring to the display content of the display unit 101, and operate the information processing apparatus 100.

The network camera 102 captures a predetermined imaging space, and transmits the captured image to the information processing apparatus 100. In the present embodiment, a case where a person 103 serving as a subject of the network camera 102 and a printed matter 104 installed in a space exist in the imaging space is described as an example. In the printed matter 104, at least a photograph 105 of a person is included. The printed matter 104 may be installed in a space by adhering to a wall or adhering to an automatic door, for example. While FIG. 1 illustrates a single printed matter 104, a greater number may be installed. Alternatively, a television may be installed in place of the printed matter, and a person may be shown on the television screen. In the following, as a representative of these, the photograph 105 of a person will be described as a candidate that may be misdetected as a person. Note that, other than a poster, a pattern on a floor or a wall may also be misdetected as a person.

Further, while in the system configuration in FIG. 1 the network camera 102 is illustrated as a device that transmits images to the information processing apparatus 100, embodiments of the invention are not limited thereto. For example, an image captured by the network camera 102 may be saved in an external server device (image server) first, and then transmitted from the server device to the information processing apparatus 100. Further, in addition to a network such as a local area network (LAN), communication between the network camera 102 and the information processing apparatus 100 may be achieved by transmitting images using a universal serial bus (USB) connection or the like, for example.

Figure 2A:
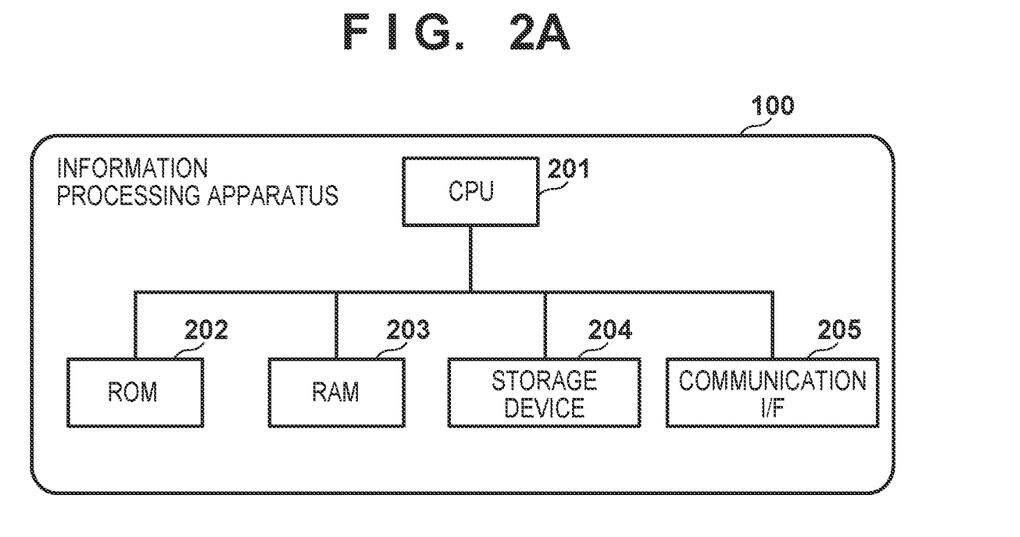
FIG. 2A is a block diagram illustrating a configuration of an information processing apparatus 100 according to an embodiment of the invention.

Next, an explanation is given regarding a hardware configuration of the information processing apparatus 100 according to the embodiment of the invention, by referring to FIG. 2A. FIG. 2A is a block diagram illustrating an example of a hardware configuration of the information processing apparatus 100. The information processing apparatus 100 according to the present embodiment is configured to include, for example, a central processing unit (CPU) 201, a read-only memory (ROM) 202, a random access memory (RAM) 203, a storage device 204, and a communication interface (I/F) 205.

The CPU 201 executes application programs, an operating system (OS), control programs, or the like, which are stored in the storage device 204, and performs control for temporarily storing information, files, and the like necessary for execution of the program in the RAM 203. Further, the CPU 201 executes processing according to the present embodiment on the basis of images and information provided from an external device (the network camera 102 or a server device) and stored in the RAM 203. Furthermore, the CPU 201 controls data transmission and reception with external devices via the communication I/F 205. Note that the processing in FIG. 4 described later is also realized by the CPU 201 controlling the overall device as predetermined function blocks, by executing corresponding processing programs.

The ROM 202 internally stores various data such as basic input/output (I/O) programs and application programs configured to execute predetermined processing. The RAM 203 temporarily stores various data and functions as a main memory, a work area, or the like for the CPU 201. Further, the RAM 203 temporarily stores information received from external devices. A hard disk (HD) that functions as a large volume memory can be used as the storage device 204 in the present embodiment. Application programs, an operating system (OS), control programs, associated programs, or the like, are stored in the storage device 204. Note that in place of the hard disk, a nonvolatile storage device such as a Flash (registered trademark) memory may be used.

The communication I/F 205 performs the role of mediating an exchange of data with the display unit 101, the network camera 102, or an external device such as a server device. Specifically, the communication I/F 205 may include a wireless communication module, and the module may include well-known circuit mechanisms, including an antenna system, a radio frequency (RF) transceiver, one or more amplifiers, a tuner, one or more oscillators, a digital signal processor, a CODEC chipset, a subscriber identity module card, memory, and the like. Further, the communication I/F 205 may include a wired communication module for a wired connection. The wired communication module facilitates communication with other devices over one or more external ports. Further, the communication I/F 205 may include various software components for processing data. The external port couples directly with other devices or indirectly over a network via the Internet, a universal serial bus (USB), IEEE1394, or the like. Note that with software for realizing functions equivalent to those of the devices described above, it is possible to configure alternatives to the hardware devices.

While the above has described an example of the constituent elements of the information processing apparatus 100, the information processing apparatus 100 may include elements other than the above, such as an instruction input unit, for example. Examples of the instruction input unit include a keyboard, a pointing device (a mouse or the like), a touch panel, or the like.

Figure 2B:
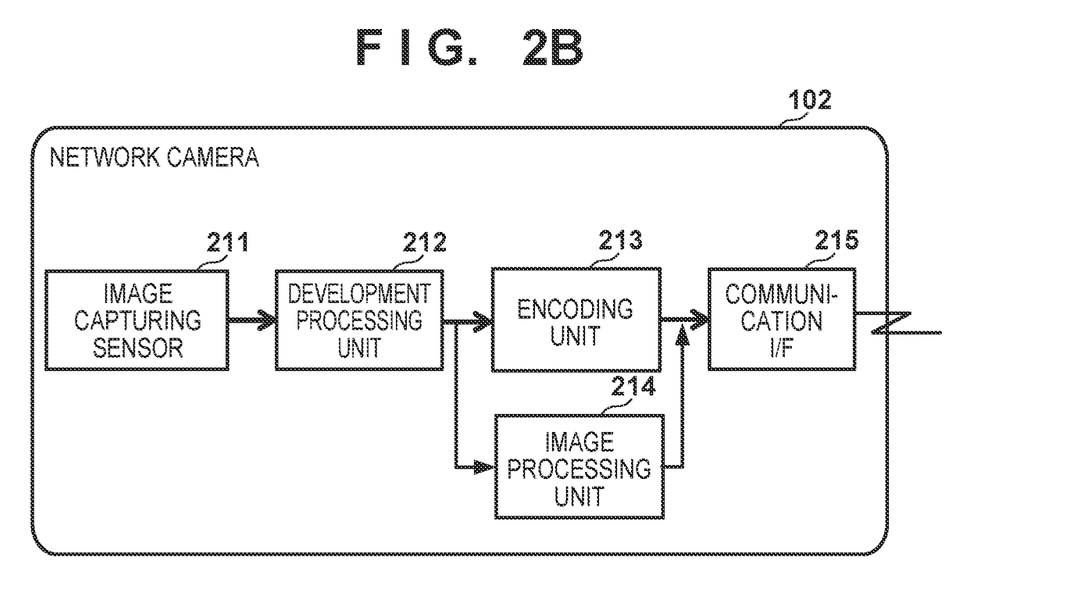
FIG. 2B is a block diagram illustrating a configuration of a network camera 102 according to an embodiment of the invention.

Next, an explanation is given regarding a functional configuration of the network camera 102 according to the embodiment of the invention by referring to FIG. 2B. FIG. 2B is a block diagram illustrating an example of a functional configuration of the information processing apparatus 100. The network camera 102 according to the present embodiment can be configured to include an image capturing sensor 211, a development processing unit 212, an encoding unit 213, an image processing unit 214, and a communication interface (I/F) 215.

The image capturing sensor 211 is configured to include image capturing devices such as a complementary metal-oxide semiconductor (CMOS) that performs photoelectric conversion on an optical image formed on an imaging surface and outputs an analog image signal, and an analog-to-digital (A/D) converter that converts the analog image signal to a digital image signal. The development processing unit 212 executes predetermined developing processing on the digital image signal output from the image capturing sensor 211. The development processing may include processing such as Debayer processing, white balance processing, gray level conversion processing, edge enhancement correction processing, scratch correction, noise cancellation, resizing processing, and color conversion to YCbCr format.

The encoding unit 213 compresses and encodes the digital image signal output by the development processing unit 212 and generates image data for distribution provided to the information processing apparatus 100. The generated image data includes the identification information (camera ID) of the network camera 102, installation location information (position information), captured time information, and the like. The encoding unit 213 also sets the frame rate during image data generation. Here, the image compression method for distribution may be based on standards such as H.264, H.265, MJPEG, or JPEG. Furthermore, image data of an arbitrary format including an mp4 or avi format or the like, may be generated.

The image processing unit 214 executes predetermined image processing on the digital image output from the development processing unit 212. The image processing may include person detection processing (in part or in whole) according to the present embodiment. The image processing result of the image processing unit 214 is transmitted along with the image data generated by the encoding unit 213 to an external device via the communication I/F 215. The communication I/F 215 is a communication interface for transmitting the image data output from the encoding unit 213 and the image processing result output from the image processing unit 214 to the information processing apparatus 100. The communication I/F 215 uses a network file system such as the Network File System (NFS) or the Common Internet File System (CIFS), or a network communication protocol such as the User Datagram Protocol (UDP) or Transmission Control Protocol (TCP) to adjust exchanges of data with a communication partner.

The network camera 102 includes the image processing unit 214, and thus can execute person detection processing according to the present embodiment in part or in whole. In this case, the remaining processing is executed on the information processing apparatus 100 side. However, in the following, first a case where person detection processing is executed on the information processing apparatus 100 side will be described.

Figure 3:
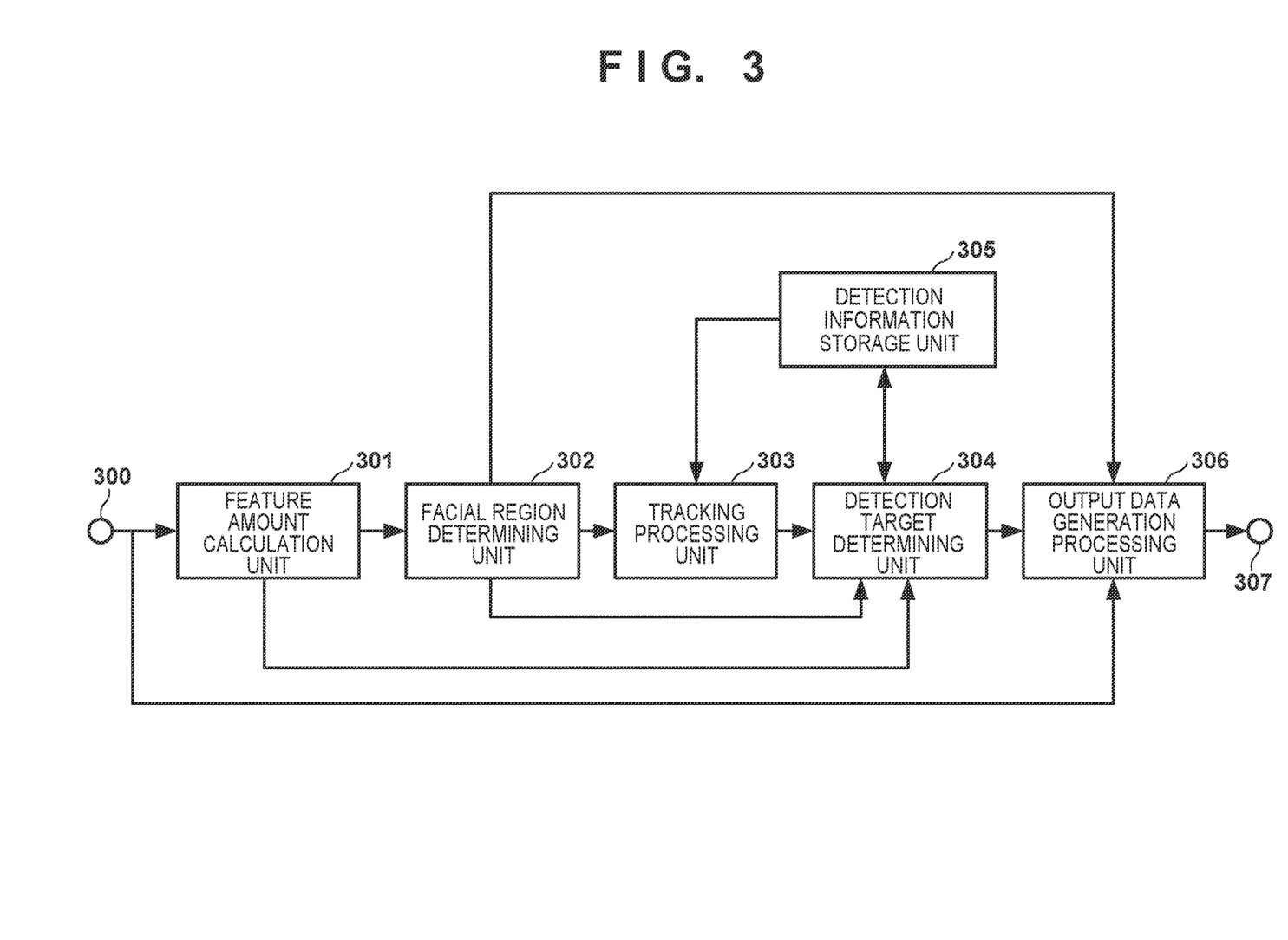
FIG. 3 is a block diagram illustrating a functional configuration of the information processing apparatus 100 according to an embodiment of the invention.

Next, an explanation is given regarding a functional configuration in a case where the information processing apparatus 100 executes person detection processing according to an embodiment of the invention by referring to FIG. 3. FIG. 3 is a functional block diagram of the information processing apparatus 100 according to the embodiment of the invention.

A plurality of images, for example, are continuously input to the information processing apparatus 100 via an input terminal 300. The input images may be dynamic images made from a plurality of frame images, or may be still images captured at a predetermined rate and sequentially input. The input images are input to a feature amount calculation unit 301, and input to an output data generation processing unit 306. The feature amount calculation unit 301 performs processing for calculating, with respect to each input image, a feature amount for extracting a subject region corresponding to a person on the basis of a predetermined index. In the present embodiment below, an explanation is given of a case where the subject region to be extracted is a region (facial region) where a portion corresponding to a person's face exists. Further, an explanation is given of a case where a concordance rate with a predetermined template is calculated as the feature amount for extracting the facial region. Specific examples of the subject region and the feature amount, however, are not limited to these, and the subject region may be a portion other than a face as long as the region allows identification of a person, and the feature amount may be a value other than a concordance rate as long as the amount is a parameter allowing indication of the subject region. The calculated concordance rate is input to a facial region determining unit 302 and a detection target determining unit 304. The facial region determining unit 302 performs processing for determining a facial region included in an image on the basis of the concordance rate calculated by the feature amount calculation unit 301. The processing result of the facial region determining unit 302 is input to a tracking processing unit 303, the detection target determining unit 304, and the output data generation processing unit 306. The tracking processing unit 303 determines whether a face is the same face by analyzing the facial regions of a plurality of temporarily consecutive (or adjacent) images. Then, the tracking processing unit 303 generates tracking information by associating the regions of each image corresponding to the same face with each other, and performs tracking control for tracking a facial region between the plurality of images.

The detection target determining unit 304 determines whether a facial region in a current image to be processed should be included in the final detection on the basis of the concordance rates, facial regions, and tracking information obtained from images processed in the past as well as the current image to be processed. A detection information storage unit 305 associates and stores the concordance rate, facial region, and tracking information obtained from the current image, and saves such information for a plurality of images. The output data generation processing unit 306 generates output data regarding a facial region determined to be a detection target, and outputs the output data to an output end 307.

Figure 4:
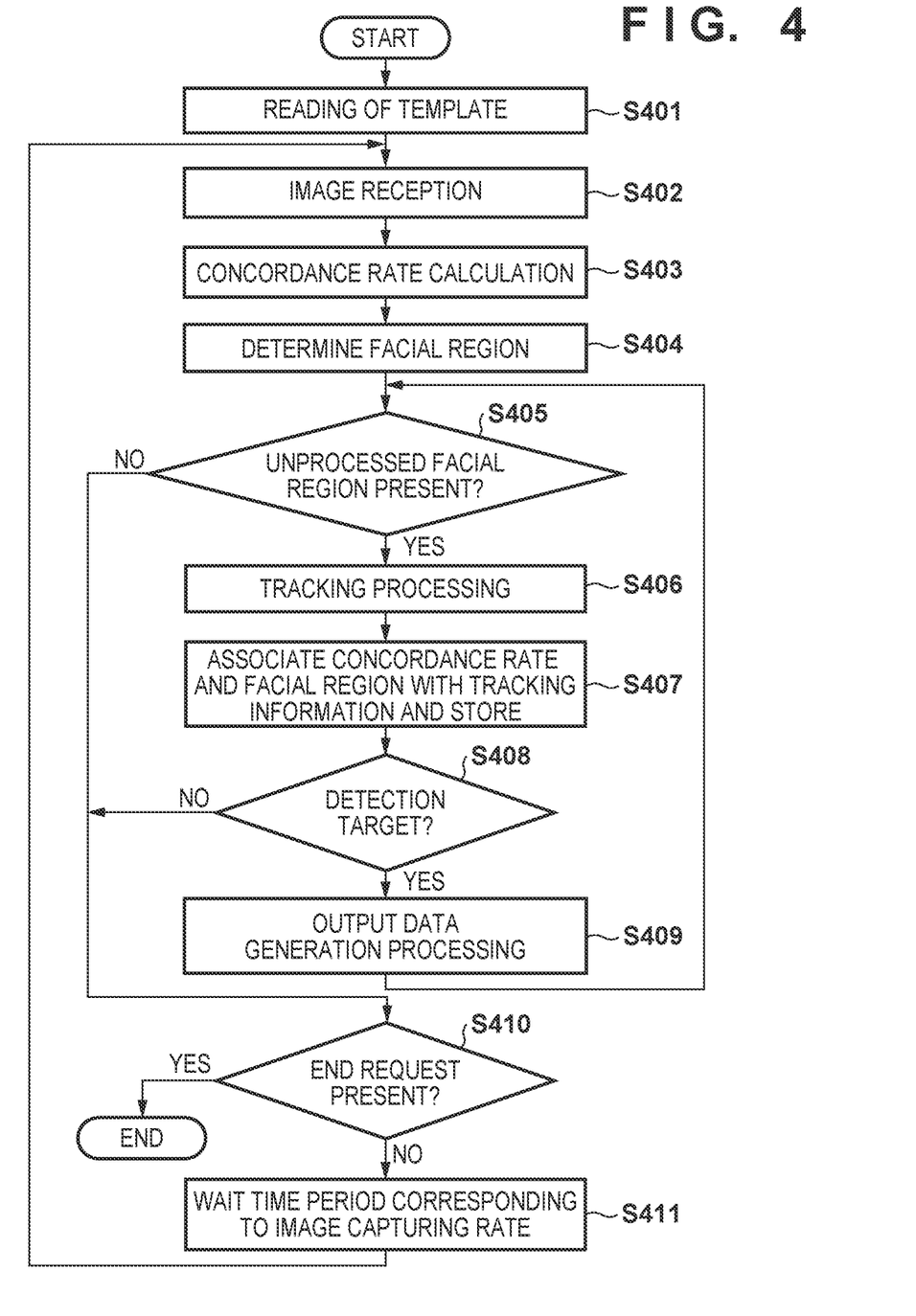
FIG. 4 is a flowchart illustrating an example of processing according to an embodiment of the invention.

Next, an explanation is given regarding the operation of each function block in FIG. 3 by referring to the flowchart in FIG. 4. FIG. 4 is a flowchart illustrating an example of the person detection processing according to an embodiment of the invention. When the processing is started, in S401, the feature amount calculation unit 301 reads a predetermined template used as a comparison standard during face detection processing. Next, in S402, an image targeted for processing in which person detection is performed from an external device such as the network camera 102 is received. Next, in S403, on the basis of the template for face detection processing read in S401, the feature amount calculation unit 301 calculates a concordance rate with the template for a plurality of regions in the current image targeted for processing. Next, in S404, on the basis of the concordance rate with the template calculated in S403, the facial region determining unit 302 determines the facial region in the image to be processed. For example, when the concordance rate is a threshold value or higher, it is determined that a face is included in the region, and that region is determined to be a facial region. Thus, the facial region determining unit 302 determines whether a subject (a face, for example) corresponding to a person is included in the image. As described above, even when a face is identified by the facial region determining unit 302, the face may not be an actual person's face, such as the case of a face in the photograph 105 of a person included in the printed matter 104. Note that the facial region can, for example, be expressed as information representing a position, a size, or the like of a face in an image.

The processing then branches in accordance with whether the facial region determined in S404 is an unprocessed facial region. When an unprocessed facial region exists ("YES" in S405), the processing transitions to S406. On the other hand, when an unprocessed facial region does not exist ("NO" in S405), the processing transitions to S410. First, in S406, the tracking processing unit 303 performs tracking control on the facial region determined in S404. Tracking control refers to processing that tracks the facial region of the same person by determining whether the person of the facial region determined in the current image targeted for processing is the same as the person of the facial region determined in a previously processed image, and then associating the facial regions of the same person across a plurality of images. Here, information related to the facial region in a previously processed image is stored in the detection information storage unit 305, and provided to the tracking processing unit 303 during tracking control. As a result, it is possible to track the movement of a facial region between images associated with movement of the same person in a space. Next, in step S407, the detection information storage unit 305 associates and stores the concordance rate and facial region obtained from the current image targeted for processing with the tracking information.

Next, in step S408, the detection target determining unit 304 determines whether the facial region to be processed corresponds to a facial region to be included in the final detection. For example, in a case where the facial region to be processed is determined to correspond to a face of a living body, it is determined that the facial region is to be included in a final search. On the other hand, in a case where the facial region to be processed is determined to not correspond to a face of a living body, it is determined that the facial region is not to be included in a final search. Next, in S409, the output data generation processing unit 306 generates output data according to a desired output format for the facial region determined to be included in detection. Subsequently, the processing returns to S405.

When there are no more unprocessed facial regions among the facial regions determined by the facial region determining unit 302 and the processing transitions to S410, the presence or absence of an end request for processing is determined in S410 and, when an end request is present, processing ends. When it is determined that there is no end request in S410, the processing waits until a time interval corresponding to the image capturing rate in S411 has elapsed, and then returns to S402. Note that, in a case where the timing of image transmission and reception for each image capturing rate is controlled on the image transmission side such as the network camera 102 or the like, the processing does not need to wait in S411. In this case, in S402, the processing may wait until an image is received, and perform the termination determination waiting of S410.

While the above has described a scenario in which the processing of S409 is executed for each unprocessed facial region in S405, the embodiments of the invention are not limited thereto. For example, the execution of the processing of S409 may be delayed until it has been determined that, according to the determination results of S405, there are no more unprocessed facial regions; and then, once there are no more unprocessed facial regions, executed all at once. In this case, the determination result of S408 may be stored in association with the information saved in S407 and, after the processing from S405 to S408 is performed on all facial regions determined in the current image subject to processing, the output data generation processing of S409 may be performed on all faces at once.

In the output data generation processing of S409, data processing corresponding to a desired output format is performed on the facial regions deemed targeted for detection in S408. Specific examples of this data processing include people count processing for counting a number of detected faces; and transition count processing for counting a number of persons who pass beyond a transition line separately specified. Examples further include authentication processing for authenticating a specific person on the basis of a concordance rate with a reference facial image separately specified; person authentication or person search processing for conducting a search; processing for estimating a person attribute such as age or gender; and rendering processing for highlighting a position of a person in an input image using a rectangle, an ellipse, or the like.

Further, the output data generation processing does not need to be performed each time a facial region is determined in an input image; and may be executed only once for the same person in conjunction with tracking information in S406, for example. Examples include application to counting people described above, making it possible to suppress counting the same person a plurality of times. Further, as another example, in the authentication of a specific person or estimation of an attribute of a person, the output data generation processing may be performed until a desired result is obtained and, once the desired result is obtained, the processing may be prevented from being performed on the same person, or the like.

Further, while the above has described a case where the detection information storage unit 305 stores the concordance rate and the facial region in association with tracking information in S407, the embodiments of the invention are not limited thereto. For example, a position and a concordance rate, or simply a concordance rate, of a face across a plurality of images may be stored, or items required in the processing executed in S408 or S409 may be stored.

Further, the template read in S401 is not limited to one; and may be a plurality of templates. Further, while the template may be applied as is for comparison in S403, an image or a template may be applied after scaling, rotation, or the like, for example, making support possible even in a case where the filming of a face in an image is unclear, and the size and orientation are unidentifiable.

Figure 5:
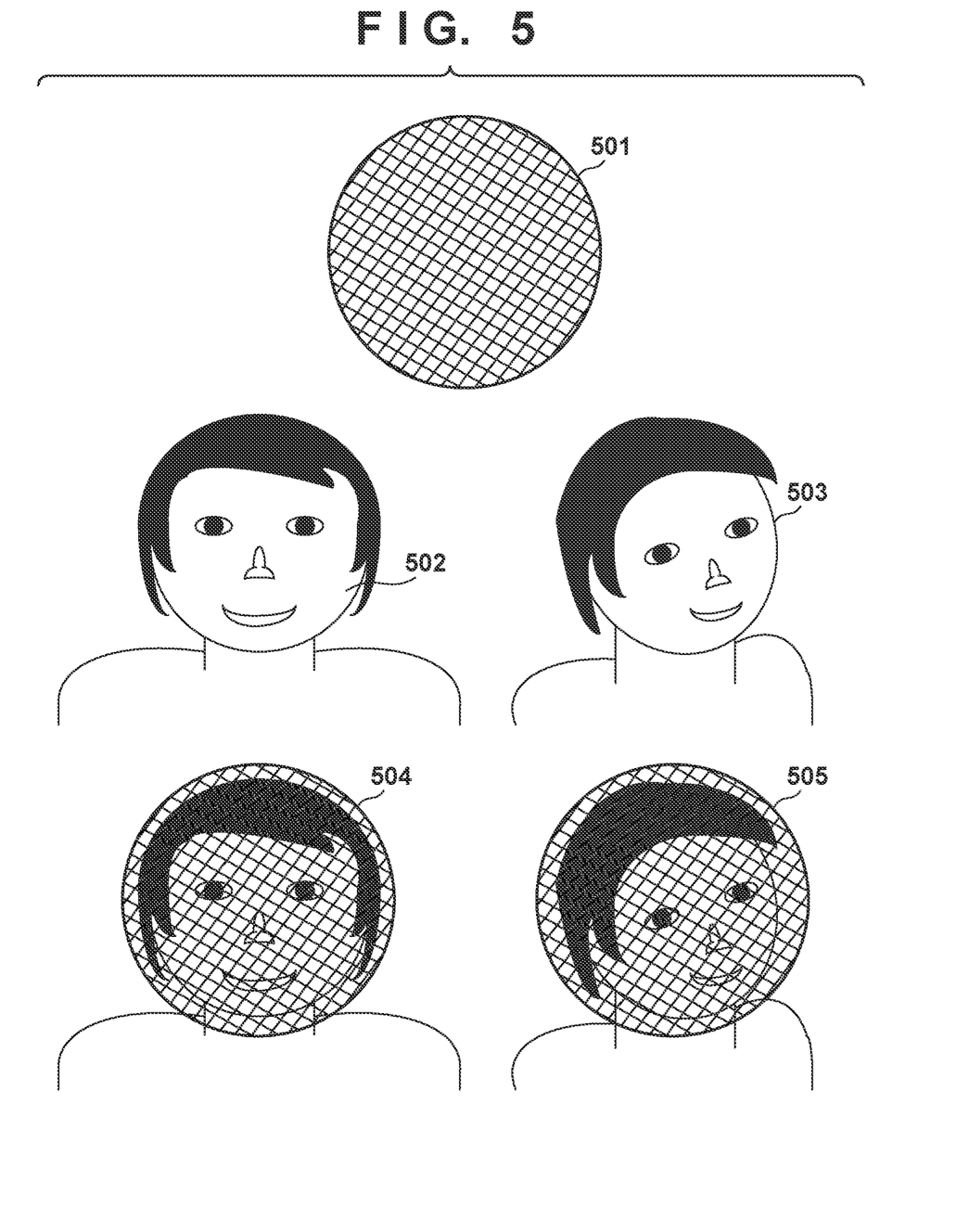
FIG. 5 shows figures illustrating detection processing of a facial region according to an embodiment of the invention.

Next, an explanation is given regarding a specific example of the concordance rate calculation processing in S403 by referring to FIG. 5. FIG. 5 shows figures illustrating the concordance rate calculation processing according to an embodiment of the invention. A graphic 501 illustrates an example of a template; and has a shape similar to a shape of a head of a person. While there are a plurality of methods for detecting a person in accordance with the purpose of detection, in a case where facial features are to be detected, a template for detecting a face when the person faces the front, allowing easy determination of facial features, can be used. Then, in the concordance rate calculation processing in S403, the input image is compared with the template and the concordance rate of an arbitrary region in the image is calculated. The facial region determining unit 302 determines that a region in which the concordance rate is a predetermined value or greater is a facial region, using the concordance rate of each region thus obtained. While FIG. 4 describes S403 of the concordance rate calculation processing and S404 of the facial region determining processing as independent steps, the feature amount calculation unit 301 may output only regions in which the concordance rate is a predetermined value or greater to the facial region determining unit 302 in S403.

Next, portrait images 502 and 503 each illustrate an example of an orientation of a person 103 who is a subject in an image, and the portrait image 502 illustrates an example in a case where the person 103 is captured facing the front relative to the network camera 102. Further, the portrait images 503 illustrates an example in a case where the person 103 is captured inclined relative to the network camera 102.

Next, portrait images 504 and 505 illustrate application examples of cases where the template is applied to the portrait images 502 and 503. Here, application examples of the template in the present embodiment include a method of detecting a region having chromatic components affiliated with skin color as a skin color region; and calculating the concordance rate between the shape of the skin color region in the image and the template. When the portrait images 504 and 505 are compared, the portrait image 504 facing more toward the front has a large coinciding surface area and a high concordance rate compared to those of the portrait image 505. Thus, the calculated concordance rate differs according to the orientation of the face, even for the same person. Note that, in a case where the persons who are the subjects differs, the color of the skin, the size of the face, and the like differ, and thus the concordance rate differs between persons. However, it is possible to estimate the presence or absence of movement in relation to the same person by focusing on the presence or absence of change in the concordance rate and the degree of change. In the detection of a skin color region in the present embodiment, a color that is not necessarily a general skin color may be included, taking into consideration the effects of race, illuminated light, and the like. That is, a template may be applied to the skin color region described above by regarding a region of substantially the same color as a skin color region.

Furthermore, the method for calculating the concordance rate is not limited to the concordance rate of the skin color region described above. For example, a method of applying an edge detection filter to an input image in advance, and calculating the concordance rate of flatness may be applied. Alternatively, in an image in which the edge detection filter has been applied, the concordance rate between an edge component of the image and an edge component of the template may be calculated. Further, as processing applied in advance, in addition to the edge detection filter, color conversion to luminance and color difference components may be performed, or scaling or rotation processing may be performed. In particular, scaling, rotation processing, and the like may be performed on the template rather than the image. Further, rather than perform processing on a template during execution, a plurality of templates may be prepared in advance. Further, in place of using a template, a similarity level or a likelihood may be calculated as a concordance rate using features converted into a database. Alternatively, the similarity level or the likelihood may be calculated as a concordance rate using results obtained from learning calculation parameters, such as in deep learning.

While the descriptions of FIG. 3, FIG. 4, and FIG. 5 above describe a case where the processed region of a person when person detection is performed is a facial region, the embodiments of the invention are not limited to a form in which person detection is performed on the basis of a facial region. For example, as another example, person detection may be performed on the basis of a head, a body (upper body or entire body), or the like. Alternatively, a horizontal view or a rear view may be detected by capturing a feature of a person other than the face as the concordance rate.

Figure 6:
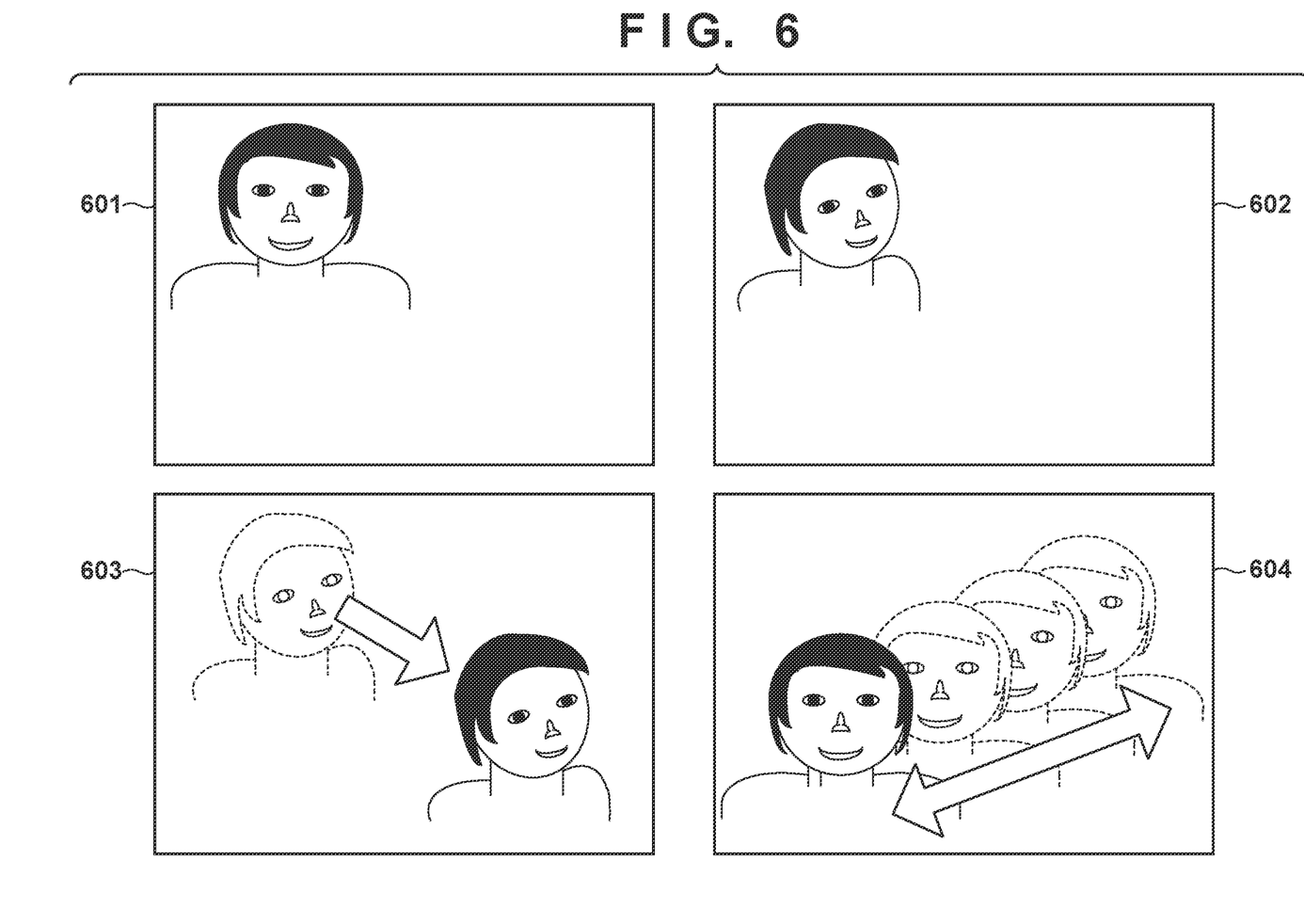
FIG. 6 shows figures illustrating person detection processing according to an embodiment of the invention.

Next, an explanation is given regarding details of the determination processing in S408 by referring to FIG. 6. FIG. 6 shows figures illustrating specific examples of determining whether a facial region obtained from an image is to be included in detection. An image 601 of FIG. 6 illustrates an example in which a person is captured in a specific position in an image, and an image 602 of FIG. 6 illustrates an example in which the person is captured in an image in substantially the same position as that in the image 601, but with a different facial orientation. In a case where a person captured in an image is a living body, the person moves and thus, even when the initial orientation of the face or body is in the state in the image 601, the orientation is predicted to change to another state, such as illustrated in the image 602. Thus, even when a person is captured in substantially the same position, the concordance rate changes between a plurality of temporarily consecutive images. On the other hand, in a case where a facial region of a person that is not a living body, such as a person printed in a poster adhered to a wall, is detected from an image, when the initial state is that in the image 601, the orientation of the face remains that in the image 601 in subsequent frames and the concordance rate is predicted not to largely change.

Here, in the determination processing in S408, in a case where the extraction position of the facial region of a person in an image is substantially the same, the concordance rate is substantially the same, and the degree of change is small, the person in the image is regarded as "not a living body", such as a person in a photograph, and excluded from detection, and the processing of S409 is skipped. On the other hand, in a case where the degree of temporal change of at least one of the concordance rate and the position of a face or a person in the image is large, preferably the person in the image is regarded as a living body and a detection target, and the processing of S409 is performed. Note that, while the concordance rate varies over time when the person is a living body since the person will perform some kind of action while under observation within a normal predetermined time period, the temporal change of the concordance rate is small for photographs and the like adhered to a flat plane such as a wall. Thus, the determination may be simply made on the basis of only a magnitude of the temporal change of the concordance rate and, in a case where the change is small, the processing of S409 may be skipped.

An image 603 of FIG. 6 illustrates another example of S408, and illustrates an example in which a position in an image of a person captured by a monitoring camera installed on a ceiling or a wall of a store or the like moves to a different position across a plurality of temporarily consecutive images. In the image 603, an example is illustrated in which the orientation of the face does not change despite the person in the image having moved, and thus the concordance rate is substantially the same. Specifically, in the case of a poster or the like adhered to an object that moves, such as an automatic door, the position moves, but the orientation of the face and the body does not substantially change, and thus the concordance rate is substantially the same. On the other hand, in a case where a person, who is a living body, moves, an optical axis of the camera capturing images from the ceiling and the orientation of the face respectively change in association with the movement of the person and an amount of deviation in the movement direction, as long as the optical axis and the movement direction of the person are not the same, making repeated appearance of similar concordance rates unlikely. Thus, in the determination processing of S408, a facial region having a concordance rate calculated a predetermined number of times or more as close to a concordance rate having a high appearance frequency is regarded as not a living body, and thus the processing of S409 is skipped. Conversely, a facial region not having a concordance rate calculated a predetermined number of times or more as close to a concordance rate having a high appearance frequency is regarded as having changed orientation, and thus the processing of S409 is preferably performed. Thus, on the basis of an occurrence frequency of substantially identical concordance rates, it is possible to prevent the processing of S409 from being applied to not only a photograph adhered to a movable door, but also to a person included in an advertisement moving image repeatedly played on an installed display, or the like.

Further, in the case of a poster adhered to an automatic door or a person included in a video on a television screen installed within a field of view, the person is continuously detected across a plurality of images and the temporal change of the concordance rate is continuously small, but then the degree of temporal change may suddenly increase temporarily. Such a phenomenon has a high probability of occurrence in a case where the scene in the video played on the television screen changes. Thus, in a case where fluctuation exceeding a predetermined level occurs in the degree of temporal change of the concordance rate, the person can be identified as not a living body. As a result, in addition to the occurrence frequency of the concordance rate, preferably the processing of S408 is performed taking into consideration the tracking information of the face or body described in S406 as well. Thus, in a case where a face or a body temporarily having a different concordance rate in a specific frame is captured, the face or body can be excluded from the processing of S409.

Furthermore, an image 604 of FIG. 6 illustrates another preferable example of S408, and illustrates a case where a person in the image moves to a different position across the frames of the moving image, but the person repeats the same trajectory. Examples of such a case include a person included in a poster or the like adhered to a door. In the case of a person in a poster adhered to a door or the like having only a defined operation range, the position and the orientation in a space may change in association with the opening and closing of the door, but the range of the changing position, the trajectory of movement, and the like are each limited to within a predetermined range. Here, in addition to the range of position and trajectory of movement, the determination of S408 may be made in conjunction with the concordance rate and the tracking information as well.

More specifically, in a case where the movement of the target person is within a specific range and the change of the concordance rate is within a predetermined range in the vicinity of a specific position, the target person is deemed as not to be included in detection and the processing of S409 is skipped. Alternatively, in a case where the movement of the target person is within a specific range and a concordance rate close to a concordance rate having a high appearance frequency has been obtained a predetermined number of times or more, the target person may be deemed as not to be included in detection, and the processing of S409 may be skipped. On the other hand, in a case where it is determined that the movement of the target person is not within a specific range, or that the concordance rate does not agree with the conditions described above, the processing of S409 for including the person in detection is applied. Furthermore, the concordance rate having a high appearance frequency described above that is adopted and used as a target for comparison may be a single, maximum value, or a plurality of values of appearance frequencies greater than or equal to a predetermined number of times.

Note that the determination of the magnitude of the degree of temporal change of the concordance rate or the proximity of a position in the descriptions above can be performed on the basis of a comparison with a predetermined threshold value. For example, in a case where the difference in concordance rates between temporally adjacent images is compared with a predetermined threshold value; and the difference is smaller than the threshold value, it can be determined that the magnitude of temporal change of the concordance rate is small or that the concordance rates are substantially the same. Further, in a case where the difference is compared with a predetermined threshold and the difference is greater than or equal to the threshold, it can be determined that the magnitude of temporal change of the concordance rate is large. Alternatively, the determination may be made by comparing a total value of differences between concordance rates within a predetermined time period with a threshold value. With regard to position, the determination can be similarly made by comparing the difference in position information (coordinates specifying a range in which a region is positioned) in images with a threshold value. Furthermore, the fluctuating range of the concordance rate may be dynamically detected to determine threshold values, and whether the concordance rate is within the determined threshold values may be determined. Further, any method may be used, such as specification of the threshold value by an operator, as long as the method allows appropriate determination.

Note that while the example above describes an illustrative scenario in which a detection target is determined in S408 by determining whether a facial region to be processed corresponds to a face of a living body, the processing may be designed so that determining whether a body is a living body is not performed. Specifically, a facial region corresponding to a person's face that is to be excluded from detection, such as that of an employee in a location such as a store register area or an information corner, may be excluded from detection. An employee in a location such as a store register area or an information corner frequently faces the same direction within a specific range. Yet, in a case where the number of persons entering a store is to be counted, the employee should be excluded from the count. Here, as described with reference to the image 604 of FIG. 6 above, in a case where the fluctuating range of the concordance rate or the like of the target person is within a specific range, the person may be excluded from detection and the application of the processing of S409 may be skipped.

This makes it possible to include necessary persons, such as customers, in detection, and exclude employees. With such processing, the permissible range of the concordance rate or position may be broadened compared to a case where a determination is made as to whether a body is a living body. For example, a region in which an employee will most likely be resident in an image may be set in advance. Then, the threshold value for determining the degree of temporal change of the concordance rate that is applied to a facial region in this region may be set to a value greater than that of other regions. Thus, in a region in which an employee is resident, the degree of temporal change of the concordance rate is detected as relatively small, making it possible to exclude the corresponding facial region from detection.

Furthermore, a location where the customers to be counted most readily stop (most readily standstill), such as near an information display board of the store, may be included in the capturing range. Here, the permissible range of the concordance rate or the position may be changed for a specific range in the image. For example, predetermined ranges within the image may be specified by a user interface (UI) operation; and allowed to be configured so that the permissible range is different for each region. Changes in the permissible range can be made by changing the threshold values for determining the concordance rate or the position. For example, in a location where customers readily stop, the degree of temporal change of the concordance rate is small. The threshold value for determining the degree of temporal change of the concordance rate is therefore set small, making it possible to detect the degree of temporal change relatively largely even when the change in concordance rate is small, and to set the corresponding facial region as a person targeted for detection. Note that the method performed irrespective of the determination of whether a body is a living body is not limited to the content described with reference to the image 604, and is similarly applicable to other examples.

In the embodiment described above, as an applied configuration, various application examples exist in addition to implementation by a software program operating in the information processing apparatus 100. Examples include a method of implementation using hardware processing or built-in software processing in the network camera 102. In this case, the image processing unit 214 executes the person detection processing of the present embodiment. Alternatively, a system configuration not limited to processing within a single device may be used, such as performing a portion of the person detection processing described above in the image processing unit 214 of the network camera 102, and performing the remaining processing in the information processing apparatus 100.

Examples of the distribution processing of the network camera 102 and the information processing apparatus 100 include a method of performing the processing up to S404, which is facial region determination processing, in the image processing unit 214 of the network camera 102; and executing the subsequent processing on the information processing apparatus 100 side. In this case, the network camera 102 transmits information specifying the facial region along with captured image data to the information processing apparatus 100. With the distributed processing, processing that does not readily depend on the number of detected faces can be executed inside the camera, resulting in the advantage that processing that follows the frame rate is more readily performed even when the frame rate is high. As another method for distribution processing, the processing of the facial region up to identity determination processing in S405 may be performed by the image processing unit 214 of the network camera 102. Thus, when a movement needs to be tracked in particular, a delay caused by communication between the network camera 102 and the information processing apparatus 100 no longer occurs, making it possible to perform feature detection processing while tracking the movement with high accuracy.

Further, a configuration in which processing within a capable range corresponding to the processing performance of the network camera 102 is performed on the network camera 102 side, and the remaining processing is performed on the information processing apparatus 100 side is also possible. The separation of the processing in this configuration may be dynamically determined in accordance with the image capturing conditions and the performance of the network camera 102, or the processing may be fixedly divided in advance. With such a configuration, in a case where many cameras are connected, the processing load of the information processing apparatus 100 is reduced, resulting in the advantage that a greater number of network cameras can be handled.

In the present embodiment, processing can be applied to appropriate persons at high speed without performing detailed analysis processing in relation to the face or body by controlling the application of subsequent processing on the basis of the concordance rate during the detection processing of the face or body. Further, the execution control of processing on appropriate persons can be performed at high speed.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-018520 filed on Feb. 5, 2018 which is hereby incorporated by reference herein in its entirety.

What is claimed is:

1. An information processing apparatus for outputting a detection result of subject detection in an image captured by an imaging unit, the information processing apparatus comprising:
one or more memories storing instructions; and
one or more processors which, when executing the instructions, cause the information processing apparatus to:
extract a first region corresponding to a target subject in a given image captured by the imaging unit, and extract a second region corresponding to the target subject in one or more images captured by the imaging unit after the given image is captured;
determine whether the target subject is to be included in the detection result, in accordance with a comparison between a threshold value and a difference between a feature obtained from the first region and a feature obtained from the second region; and
output the detection result, in response that the target subject is determined to be the detection result,
wherein the threshold value corresponding to a region designated by a user is set so as to be different from the threshold values corresponding to other regions.

2. The information processing apparatus according to claim 1, wherein
the target subject is determined to be the detection result, if the difference between the feature obtained from the first region and the feature obtained from the second region is greater than or equal to the threshold value; and
the target subject is not determined to be the detection result, if the difference between the feature obtained from the first region and the feature obtained from the second region is less than the threshold value.

3. The information processing apparatus according to claim 2, wherein the threshold value is defined differently in accordance with a region in the image.

4. The information processing apparatus according to claim 1, wherein the target subject is not determined to be the detection result, if fluctuation exceeding a predetermined level occurs in the difference between the feature obtained from the first region and the feature obtained from the second region among a plurality of images captured by the imaging unit.

5. The information processing apparatus according to claim 1, wherein the one or more processors further cause the information processing apparatus to determine whether to make the target subject to be the detection result, in accordance with a comparison between a predetermined value and a difference between a position of the first region and a position of the second region, and wherein
the target subject is determined to be the detection result, if the difference is equal to or greater than the predetermined value or the difference between the feature obtained from the first region and the feature obtained from the second region is equal to or greater than the threshold value; and
the target subject is not determined to be the detection result, if the difference is less than the predetermined value and the difference between the feature obtained from the first region and the feature obtained from the second region is less than the threshold value.

6. The information processing apparatus according to claim 1, wherein a feature amount obtained from the first region is corresponding to a concordance rate based on a comparison between a predetermined template and the first region, and a feature amount obtained from the second region is corresponding to a concordance rate based on a comparison between the predetermined template and the second region.

7. The information processing apparatus according to claim 6, wherein
the first region and the second region are regions corresponding to a face of a person,
the predetermined template corresponds to a face of a person in a predetermined orientation, and
the concordance rates change in accordance with orientations of the face included in the first region and the second region.

8. The information processing apparatus according to claim 1, wherein the first region and the second region are regions corresponding to a face of a person, a head of the person, or a body of the person.

9. An information processing method for outputting a detection result of subject detection in an image captured by an imaging unit, the method comprising
extracting a first region corresponding to a target subject in a given image captured by the imaging unit, and extracting a second region corresponding to the target subject in one or more images captured by the imaging unit after the given image is captured;
determining whether the target subject is to be included in the detection result, in accordance with a comparison between a threshold value and a difference between a feature obtained from the first region and a feature obtained from the second region; and
outputting the detection result, in response that the target subject is determined to be the detection result,
wherein the threshold value corresponding to a region designated by a user is set so as to be different from the threshold values corresponding to other regions.

10. A non-transitory computer-readable storage medium storing a program including instructions that, when executed by a processor of an information processing apparatus, causes a processor to perform an information processing method for outputting a detection result of subject detection in an image captured by an imaging unit, the method comprising:
extracting a first region corresponding to a target subject in a given image captured by the imaging unit, and extracting a second region corresponding to the target subject in one or more images captured by the imaging unit after the given image is captured;
determining whether the target subject is to be included in the detection result, in accordance with a comparison between a threshold value and a difference between a feature obtained from the first region and a feature obtained from the second region; and
outputting the detection result, in response that the target subject is determined to be the detection result,
wherein the threshold value corresponding to a region designated by a user is set so as to be different from the threshold values corresponding to other regions.

11. The information processing apparatus according to claim 1, wherein the threshold value corresponding to a region designated by a user is set so as to be smaller than the threshold values corresponding to other regions.

12. The information processing apparatus according to claim 1, wherein the difference between the feature obtained from the first region and the feature obtained from the second region indicates a degree of a temporal change of features, and
when the degree of the temporal change of features is larger than the threshold value corresponding to the first region, the target subject is included the detection result.

* * * * *